United States Patent Office 3,194,848
Patented July 13, 1965

3,194,848
PROCESS FOR DIMER AND TRIMER PREPARATION
Julian Feldman, Bernard A. Saffer, and Martin Thomas, Cincinnati, Ohio, assignors to National Distillers and Chemical Corporation, New York, N.Y., a corporation of Virginia
No Drawing. Filed Dec. 31, 1962, Ser. No. 248,199
10 Claims. (Cl. 260—666)

This invention relates to a process for the production of cyclic dimers and trimers from linear conjugated diolefinic compounds. More particularly, this invention relates to the production of 1,5-cyclooctadiene and 1,5,9-cyclododecatriene from 1,3-butadiene using a zerovalent nickel catalyst derived from 1-methyl-4-phospha-3,5,8-trioxabicyclo[2,2,2]octane.

The prior art shows the production of cycloolefin dimers from conjugated open chain diolefinic compounds using a catalyst derived from nickel carbonyl by the replacement of at least one of the carbonyl groups thereof with certain trivalent nitrogen, phosphorus, antimony and arsenic compounds. In this process cyclic trimers are formed in minor quantities.

An entirely new type of nickel catalyst has now been found which is effective in the above reaction to produce a mixture of cyclic dimers and trimers. These catalysts are derivatives of 1-methyl-4-phospha-3,5,8-trioxabicyclo [2,2,2] octane which has the formula:

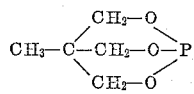

The preparation of this compound is described by Verkade and Reynolds, J. Organic Chemistry 25, 663 (1960), and its name is designated as "phos."

The new catalyst of our invention have the following formula:

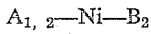

wherein A is "phos," as defined above, and B is selected from the group consisting of cinnamonitrile, acrylonitrile, acrolein and carbonyl. The mono-"phos" derivatives are especially preferred, as greater polymerization yields are generally obtained using these catalysts as indicated by the data in Table I.

It is an object of this invention to prepare cyclic dimers and trimers of linear conjugated diolefinic compounds.

It is a further object of this invention to prepare 1,5-cyclooctadiene and 1,5,9-cyclododecatriene from 1,3-butadiene.

Another object of this invention is to provide new catalysts in the process for the production of cyclic dimers and trimers of linear conjugated diolefinic compounds.

Further objects will be apparent to those skilled in the art from a consideration of the following description.

According to our invention "phos" is prepared in a known manner by dissolving 1,1,1-trimethylol ethane in pyridine and mixing with a tetrahydrofuran solution of phosphorus trichloride at a temperature below 55° C. After filtering the pyridinium hydrochloride, solvents are removed in vacuo and the product is vacuum sublimed from the residue.

The ligands, cinnamonitrile, acrylonitrile, and acrolein react with nickel carbonyl to produce a highly reactive nickel complex. This reaction is brought about by refluxing nickel carbonyl with the ligand for about 6 hours in an anhydrous solvent, or in a large volume of the participating ligand. Acrolein and acrylonitrile are each distilled and stabilized with hydroquinone before use. Before refluxing, care is taken to remove atmospheric oxygen by flushing the reaction vessel with nitrogen. The amount of nickel carbonyl used varies from 0.03 to 0.10 mole while that of the ligand varies from 0.06 to 0.20 mole. However, in each case the ratio of nickel carbonyl to ligand is 1:2. During refluxing, carbon monoxide is evolved, which can be measured to determine whether the reaction is quantitative, and the crystalline complexes are formed. The product is filtered, washed with a solvent such as methanol and ether, and dried, for example, on a sintered glass funnel under nitrogen. For convenient handling the funnel containing the dry crystals is stoppered and sealed before it is transferred to a "dry bag" where the crystals are placed in a bottle and stored in a glass dessicator under nitrogen until used.

The preparation of the adduct with "phos" involves refluxing the parent compound in a solution of the various ligands under an atmosphere of nitrogen for reaction time ligands under an atmosphere of nitrogen for reaction times of from 4 to 20 hours until there is a definite color change. The mono- adduct is obtained when the ratio of parent compound to ligand is 1:1. Generally, the bis- adduct is obtained only when the ligand is present in considerable excess. Exclusion of atmospheric oxygen is necessary. Therefore, all operations such as loading the reaction vessel, filtering, drying and weighing of complexes are performed in an inert atmosphere.

The concentration of catalyst has been conveniently utilized in the polymerization reaction at about 1% of the amount of the diolefin charged. However, higher or lower catalyst concentrations are practical. As low as 0.5% of catalyst gives excellent results, and about 3% has been used successfully. A range of 0.1 to 10% by weight is practical.

The conjugated diolefins especially suitable as starting materials for our invention have from about four to eight carbon atoms. The preferred diolefin is 1,3-butadiene; other conjugated open chain diolefins, particularly 1,3-diolefins, are useful, including 2-methyl-1,3-butadiene (isoprene); 2,3-dimethyl-1,3-butadiene; 2-chloro-1,3-butadiene (chloroprene); 2,3-dichloro-1,3-butadiene; 1,3-pentadiene (piperylene); phenyl diolefins; and 2,4-hexadiene; mixed halogen derivatives may be used, including chloro-fluoro-1,3-butadienes.

It is desirable but not essential to use a polymerization inhibitor such as p-tertiary butyl catechol to prevent the formation of unwanted by-products. The maximum p-tertiary butyl catechol concentration tolerable in the reaction mixture is about 0.2% based on 1,3-butadiene. The product ratio decreases when higher concentrations are used. A small amount of polymer is formed when less than 0.05% inhibitor is used.

If the reagents are not adequately dry, it is beneficial to pretreat with a dehydrating agent, or to incorporate a dehydrating agent in the reaction mixture. Suitable for this is ethylene oxide, calcium oxide, calcium carbide, and calcium sulfate.

Oxygen must be excluded from the reaction mixture. This is very important; even the small traces of oxygen found in ordinary nitrogen are deleterious.

The yield of the dimeric products varies with temperature. The polymerization reaction is carried out at an elevated temperature. Temperatures within the range of about 70° C. to about 160° C. are satisfactory. The preferred range is from about 100° to 130° C. At higher temperatures the rate of formation of 4-vinyl-1-cyclohexene by thermal dimerization of 1,3-butadiene becomes appreciable and polymerization of the 1,3-butadiene occurs. The rate of formation of dimers at temperatures below about 70° C. is usually too low for practical purposes.

Widely varying pressures have been successfully used. By way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

The time is not critical. The reaction is usually substantially complete within ½ to 20 hours. The preferred time is from about 2 to about 15 hours.

When the reaction is complete, the volatile constituents of the reaction mixture are preferably removed by vacuum distillation or steam distillation from polymeric material, calcium salts, and catalyst. The volatile constituents are condensed and the condensate fractionally distilled to recover 1,5-cyclooctadiene and 1,5,9-cyclododecatriene.

The following examples illustrate methods of carrying out the present invention but it is to be understood that these examples are given for purposes of illustration and not of limitation.

EXAMPLE 1

1-methyl-4-phospha - 3,5,8 - trioxabicyclo[2,2,2]octane ("phos") is prepared by adding the following solutions simultaneously to 340 ml. of tetrahydrofuran with rapid stirring (nitrogen atmosphere).

Solution 1.—36 g. of 1,1,1-trimethylolethane dissolved in 100 ml. of anhydrous pyridine and diluted to 225 ml. with tetrahydrofuran.

Solution 2.—26.4 ml. of $PCl_3$ diluted to 225 ml. with tetrahydrofuran.

The pyridinium hydrochloride is allowed to settle before the mixture is filtered. The solvent is distilled from the solution in vacuo until the residue is a thick syrupy mass from which the product is removed by sublimation in vacuo. The product is recrystallized from hot heptane.

Nickel dicinnamonitrile is prepared by refluxing 8.6 g. of nickel carbonyl in a solution of 13.4 g. of cinnamonitrile in 13 ml. of ether for 4 hours. The violet compound is filtered and washed with methanol and ether and then dried.

Bis("phos") nickel dicinnamonitrile is prepared by refluxing 0.69 g. of solid nickel dicinnamonitrile in a solution of 0.76 g. of "phos" in 50 cc. of ether for 8 hours. The grey crystals are filtered, washed with ether and dried. The yield is 81% of a product having the composition: Ni, theory 9.6%, found 12.8%; phosphorus, theory 10.1%, found 11.6%. IR absorption for the CN band—strong.

EXAMPLE 2

Nickel diacrolein is prepared by refluxing 18 g. of nickel carbonyl in 158 ml. of freshly distilled acrolein (stabilized with hydroquinone) for 4 hours. The violet compound is filtered and washed with methanol and ether.

Mono("phos") nickel diacrolein is prepared by refluxing 1.1 g. of nickel diacrolein in a solution of 0.96 g. of "phos" in 50 cc. of ether for 4–5 hours. The deep violet color of nickel diacrolein changes to green. The green solid is filtered and washed with ether.

EXAMPLE 3

In order to compare the relative efficiencies of the various catalysts in the polymerization reaction standardized techniques were used so as to eliminate chance variables that could affect the rate of reaction. The materials used were:

| | Percent |
|---|---|
| Catalyst | 1–5 |
| Inhibitor (p-tertiarybutyl catechol) | 0.1 |
| Calcium carbide | 1–10 |
| p-Xylene | 10 |
| 1,3-butadiene | Remainder | p-Xylene served as an internal standard in the vapor phase chromatographic analysis of the reaction mixture. It was purified by passing it through a one-foot column of silica gel. p-Tertiary butyl catechol served as a polymerization inhibitor for butadiene and the oligomers formed. Oxygen-free nitrogen was obtained by passing water pumped "pre-purified nitrogen" containing 0.001% $O_2$ maximum through No. 4A Microsieves, and then through Harshaw 4% copper catalyst on alumina at 240° C. The microsieves and copper catalyst were preactivated by passing through hydrogen at 300° C. in excess of about 2 hours. Liquid butadiene was obtained by distillation from C.P. cylinder butadiene into a nitrogen-purged serum-capped glass bottle in Dry Ice. Lump calcium carbide was freshly ground under nitrogen in a mortar and pestle to about 20 mesh.

Reactions were carried out in 10 ml. 5/16″ x 8″ stainless steel microreactors having covers at the bottom. The top covers were connected to midget valves by means of glands and 1/16″ stainless steel tubing. Teflon gaskets cut from sheet by suitable cork borers minimized leakage. The reactor was charged as follows: With the top cover off, it was purged with nitrogen. One-half gram of freshly ground calcium carbide was added, followed by 0.3 ml. of a solution of p-tertiary butyl catechol (1.07 wt. percent) in p-xylene. The catalyst was then added, under nitrogen. When inert atmosphere was unnecessary, the catalyst was added in solution with the p-xylene and p-tertiary butyl catechol. The reactor was then capped and pressured to 200 p.s.i.g. with oxygen-free nitrogen. It was tested for leaks by immersion in hexane, after which it was cooled by packing in solid $CO_2$. The gland in the top cover was then removed and the opening temporarily plugged with a small 3/16 inch rubber serum cap. Approximately 6 ml. of liquid butadiene was added to the reactor through the serum cap by means of a hypodermic syringe which had been cooled by packing it in solid $CO_2$ for a short period of time. The serum cap was then removed and replaced quickly with the gland carrying the midget valve. The reactor was purged six times with oxygen-free nitrogen by repeatedly pressuring to 200 p.s.i.g. and releasing to atmosphere. The reaction mixture was heated at 120° C. overnight by placing the reactor in an oil bath equipped with thermostatic controls. The products were analyzed by vapor phase chromatrography. The product yields for the catalysts used are shown in Table I.

Table I

| | Yield of CDT [1], Percent | Yield of COT [1], Percent |
|---|---|---|
| Bis("phos") nickel dicinnamonitrile | 17 | 4.4 |
| Mono("phos") nickel diacrolein | 25 | 40 |
| Bis("phos") nickel dicarbonyl | 29 | 5.7 |

[1] CDT is 1, 5, 9-cyclododecatriene; COD is 1, 5-cyclooctadiene.

Various changes and modifications may be made in carrying out the present invention without departing from the scope thereof. Insofar as these changes and modifications are within the purview of the annexed claims, they are to be considered as part of the invention.

What is claimed is:

1. A process for the production of cyclic dimers and cyclic trimers which comprises polymerizing a linear conjugated diolefin at an elevated temperature in the presence of a catalyst which is characterized by the formula:

wherein A is 1-methyl-4-phospha-3,5,8-trioxabicyclo [2,2,2]octane, and B is selected from the group consisting of cinnamonitrile, acrylonitrile, acrolein and carbonyl.

2. The process of claim 1 wherein said catalyst is bis(1-methyl-4-phospha - 3,5,8 - trioxabicyclo[2,2,2]octane) nickel dicinnamonitrile.

3. The process of claim 1 wherein said catalyst is 1-methyl-4-phospha-3,5,8-trioxabicyclo[2,2,2]octane nickel diacrolein.

4. The process of claim 1 wherein said catalyst is tane) nickel dicarbonyl.

5. The process of claim 1 wherein said diolefin is 1,3-butadiene.

6. A catalyst which is characterized by the formula:

$$A_{1,2}\text{—Ni—}B_2$$

wherein A is 1-methyl-4-phospha-3,5,8-trioxabicyclo[2,2,2]octane and B is selected from the group consisting of cinnamonitrile, acrylonitrile, acrolein and carbonyl.

7. 1-methyl-4-phospha-3,5,8-trioxabicyclo[2,2,2]octane nickel diacrolein.

8. Bis(1-methyl-4-phospha-3,5,8-trioxabicyclo[2,2,2]octane) nickel dicinnamonitrile.

9. 1-methyl-4-phospha-3,5,8-trioxabicyclo[2,2,2]octane nickel dicarbonyl.

10. A process for the production of cyclic dimers and cyclic trimers having from about 4 to 8 carbon atoms per molecule which comprises polymerizing a linear conjugated diolefin at a temperature within the range of about 70° to 160° C. in the presence of a catalyst which is characterized by the formula:

$$A_{1,2}\text{—Ni—}B_2$$

wherein A is 1-methyl-4-phospha-3,5,8-trioxabicyclo[2,2,2]octane, and B is selected from the group consisting of cinnamonitrile, acrylonitrile, acrolein and carbonyl.

References Cited by the Examiner

UNITED STATES PATENTS

| | | | |
|---|---|---|---|
| 2,504,016 | 4/50 | Foster | 260—666 |
| 2,686,208 | 8/54 | Reed | 260—666 |
| 2,686,209 | 8/54 | Reed | 260—666 |

OTHER REFERENCES

Schrauzer: J. American Chemical Society, vol. 81, pp. 5310–12 relied on, 1959.

Schrauzer: J. American Chemical Society, vol. 82, pp. 1008–9 relied on, 1960.

ALPHONSO D. SULLIVAN, *Primary Examiner.*